United States Patent [19]
Arena

[11] Patent Number: 4,720,215
[45] Date of Patent: Jan. 19, 1988

[54] RIVET DELIVERY SYSTEM

[75] Inventor: Pat S. Arena, Jensen Beach, Fla.

[73] Assignee: Grumman Aerospace Corporation, Bethpage, N.Y.

[21] Appl. No.: 23,993

[22] Filed: Mar. 16, 1987

Related U.S. Application Data

[63] Continuation of Ser. No. 666,882, Oct. 31, 1984, abandoned.

[51] Int. Cl.⁴ .................................. B65G 53/58
[52] U.S. Cl. .................................. 406/105; 221/175; 221/278; 227/112; 227/51
[58] Field of Search ............... 221/278, 171, 172, 173, 221/175; 406/105, 148, 149, 150, 153, 93; 227/112, 119, 51, 114

[56] References Cited

U.S. PATENT DOCUMENTS

| | | | |
|---|---|---|---|
| 2,549,322 | 4/1951 | McKinsey | 221/171 X |
| 2,818,964 | 1/1958 | Picard et al. | 221/175 X |
| 3,326,496 | 6/1967 | Auberson | 406/93 X |
| 3,448,236 | 6/1969 | Spisak | 221/278 |
| 4,149,684 | 4/1979 | Warmann | 406/148 |
| 4,174,028 | 11/1979 | Barnes | 221/175 X |
| 4,208,153 | 6/1980 | Trethewy | 221/264 X |
| 4,392,439 | 7/1983 | Herriau | 221/278 X |

FOREIGN PATENT DOCUMENTS 2148396 4/1973 Fed. Rep. of Germany.

Primary Examiner—Joseph J. Rolla
Assistant Examiner—Nils Pedersen
Attorney, Agent, or Firm—Richard G. Geib; Daniel Jay Tick; Bernard S. Hoffman

[57] ABSTRACT

An apparatus for delivering properly positioned rivets to a hopper and including a venturi station, a conduit connected to the venturi station for delivering the rivets from the venturi station to the hopper and having a restricted end for automatically properly positioning the rivets, a rivet shaped slot for introducing the rivets into the venturi station, and components for creating a suction in the venturi station so that when the rivets are introduced into the venturi station by the rivet shaped slot the rivets are drawn by the suction created by the suction creating components through the venturi station and the delivering conduit from the rivet shaped slot to the restricted end of the delivering conduit where the rivets are automatically properly positioned in the hopper for riveting.

3 Claims, 4 Drawing Figures

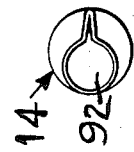
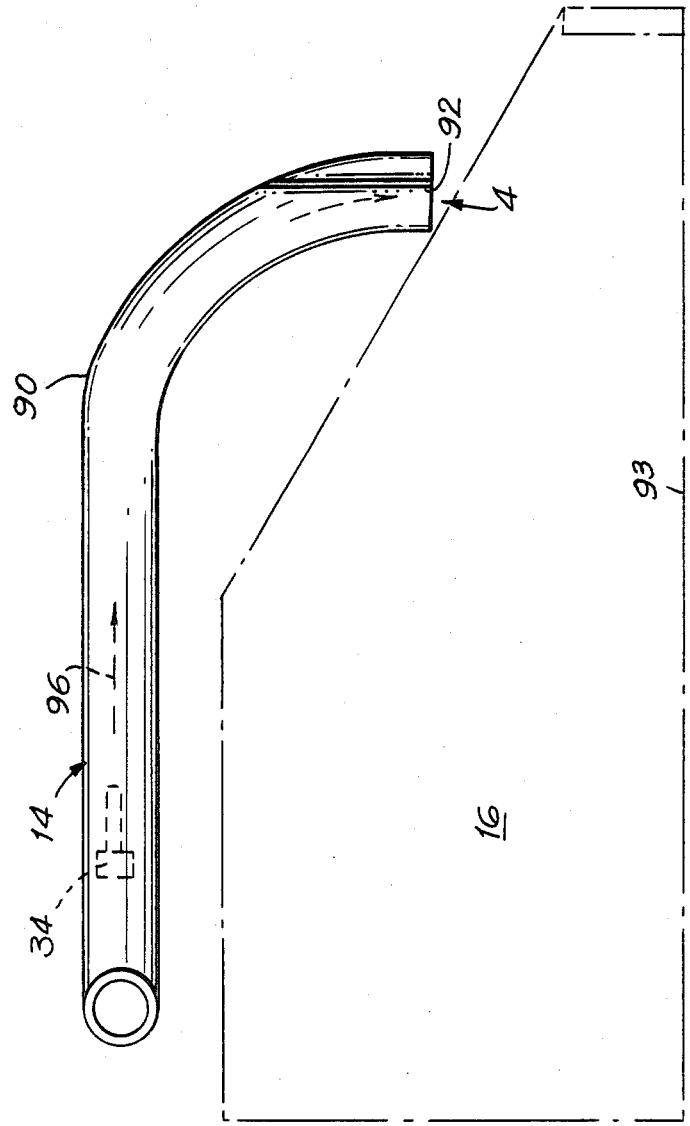

RIVET DELIVERY SYSTEM

This is a continuation of copending application Ser. No. 666,882, filed Oct. 31, 1984, and now abandoned.

BACKGROUND OF THE INVENTION

The present invention relates to a rivet delivery system. More particularly, the present invention relates to a rivet delivery system having the capability of delivering a rivet to a revotely located worksite.

Rivets for an automatic riveting machine are fed automatically from a hopper into mechanical fingers in the upper anvil of the riveting head of the automatic riveting machine. A number of hoppers, each containing rivets of a specific length, are provided. When the workpiece requires rivets of a specific length, the appropriate hopper containing those rivets is installed on the automatic riveting machine. However, with certain workpieces, the rivet length requirement changes every couple of holes making it impossible to use any one specific hopper. The machine operator is thus required to climb onto the machine and manually insert the correct rivet into the upper anvil fingers. This is a dangerous, time-consuming procedure. The teachings of many patents have attempted to overcome this problem.

For example, U.S. Pat. No. 1,413,727 to Hanly relates to an apparatus for delivering hot rivets from a rivet forge or furnace to a remote location.

In Hanly, a hot rivet is placed in an intake pipe and a valve is immediately opened. A charge of compressed air is directed through a nozzle into the piping and the rivet is propelled through the piping to a remote opening in the piping where a bucket is set. The rivet is thrown into the bucket and the operator inserts tongs to remove the rivet.

Firstly, Hanly teaches delivering hot rivets from a rivet forge or furnace. Thus, the delivered rivets would be hot and not feasible for utilization in an automatic riveting machine. Secondly, Hanly is silent to means for orientating the delivered rivets. The delivered rivets are merely thrown into a bucket randomly and not properly positioned in a hopper for use in an automatic riveting machine.

Another example, U.S. Pat. No. 4,208,153 to Trethewy relates to a dispensing apparatus having a plurality of gates for selectively dispensing individual articles such as rivets from a supply to a remotely located riveting machine.

In Trethewy, rivets are stored in cylinders which must be vibrated so that the rivets are fed to the associated tracks. Compressed air moves the rivets into and through the conduit to the remote riveting machine.

Firstly, Trethewy teaches the need to vibrate the containers containing the rivets in order to feed the rivets to the associated tracks. Thus, additional structure is necessary to vibrate the containers, air under pressure is needed to initially assist in properly orientating the rivets, and a cover is needed and placed over the tracks to prevent the rivets from becoming disorientated. Secondly, Trethewy teaches the use of compressed air to propel the rivets out of the passageway, through the longitudinal passageway, and the feeding conduit. By using compressed air to propel the rivets, as opposed to suction to draw the rivets through the delivery conduit, the exit orifice of the delivery conduit will be subjected to bursts of compressed air which could disorientate the rivet, damage the exit orifice of the delivery conduit and possibly damage the automatic riveting machine.

Other U.S. patents cited for their remote feeding capability but not appearing to be pertinent to Applicant's disclosure are:

| U.S. Pat. No. | To |
| --- | --- |
| 3,030,832 | Filangeri et al |
| 3,339,799 | Spisak |
| 3,448,236 | Spisak |
| 3,540,622 | Spisak |
| 3,554,403 | Ginther |
| 4,278,184 | Willis |

SUMMARY OF THE INVENTION

Accordingly, it is the primary object of the present invention to provide a rivet delivery system that avoids the disadvantages of the prior art.

More particularly, it is an object of the present invention to provide a rivet delivery system which is neither dangerous nor time consuming and enables the machine operator, from his console, to drop a rivet of the correct length into a rivet slot of the venturi station of the rivet delivery system and then the rivet is delivered, by suction, to the hopper where it is automatically set into the upper anvil fingers of the automatic riveting machine for installation into the workpiece.

In keeping with these objects, and with others which will become apparent hereinafter, one feature of the present invention resides, briefly stated, in an apparatus for the delivery of properly positioned rivets to a hopper and has a venturi station, a conduit connected to the venturi station to deliver the rivets from the venturi station to the hopper, means for the proper introduction of the rivets into the venturi station, means disposed in the delivering conduit to automatically properly position the rivets wherein means to create a suction in the venturi station is provided so that when the rivets are properly introduced into the venturi station by the introducing means the rivets are drawn by the suction created by the suction means through the venturi station and the delivering conduit from the introducing means to the positioning means where the rivets are automatically properly positioned in the hopper for riveting.

When the rivet delivery system is designed in accordance with the present invention, means are provided in the venturi station for the proper introduction of the rivets into the venturi station, means are provided in the delivery conduit to automatically properly position the rivets, and means are provided to create a suction in the venturi station so that when the rivets are properly introduced into the venturi station by the introducing means the rivets are drawn by the suction created by the suction means, as opposed to being propelled by compressed air, through the venturi station and the delivering conduit from the introducing means to the positioning means where the rivets are automatically properly positioned in the hopper for riveting and not deflected as is possible if compressed air were used to propel the rivet.

In accordance with another feature of the present invention the introducing means is disposed at the inlet end of the venturi station.

Still another feature of the present invention is that the introducing means include a slot.

A further feature of the present invention is that the slot is rivet shaped so as to prevent incorrect entry of the rivets and to assist in the proper positioning of the rivets.

Another feature of the present invention is that the positioning means is disposed at the outlet end of the delivering conduit.

Still another feature of the present invention is that the positioning means include a pinched orifice in the outlet end of the delivering conduit.

Yet another feature of the present invention is that the venturi station includes controlling means for optimizing the suction created by the suction means.

Still yet another feature of the present invention is that the venturi station includes an air supply in the range of 5 psi to 10 psi.

Yet still another feature of the present invention is that the suction means is disposed in the venturi station below the introducing means.

Still another feature of the present invention is that the venturi station includes a longitudinal axis and the suction means include at least one inlet bore disposed at an angle of substantially 30° to the longitudinal axis of the venturi station.

Yet another feature of the present invention is that the suction means include at least one relief bore disposed substantially perpendicular to the longitudinal axis of the venturi station.

Still yet another feature of the present invention is that the controlling means is disposed downstream of the suction means.

Another feature of the present invention is that a plurality of rivets may be automatically fed to the hopper.

Yet another feature of the present invention is that the introducing means further include a sleeve movable over the slot to permit automatic close system operation.

Still another feature of the present invention is that the plurality of rivets can be in the range of 2 rivets to 300 rivets.

Yet still another feature of the present invention is that it has 8 inlet bores.

Still yet another feature of the present invention is that it has 16 relief bores.

Yet another feature of the present invention is that the air supply is disposed upstream of the suction means.

Another feature of the present invention is that air from the air supply enters the venturi station intermediate the introducing means and the suction means in a direction transverse to the longitudinal axis of the venturi station.

Finally, a further feature of the present invention is that the air supply exits the venturi station in a direction transverse to the longitudinal axis of the venturi station and at pressure lower than the pressure of the air entering the venturi station intermediate the introducing means and the suction means.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a fragmented side view of the end of the delivery conduit of the present invention shown in FIG. 1; and FIG. 4 is a view of the exit orifice of the delivery conduit as shown in the direction of arrow 4 in FIG. 3.

DETAILED DESCRIPTION OF THE PREFERRED EMBODIMENT

Figure 1:
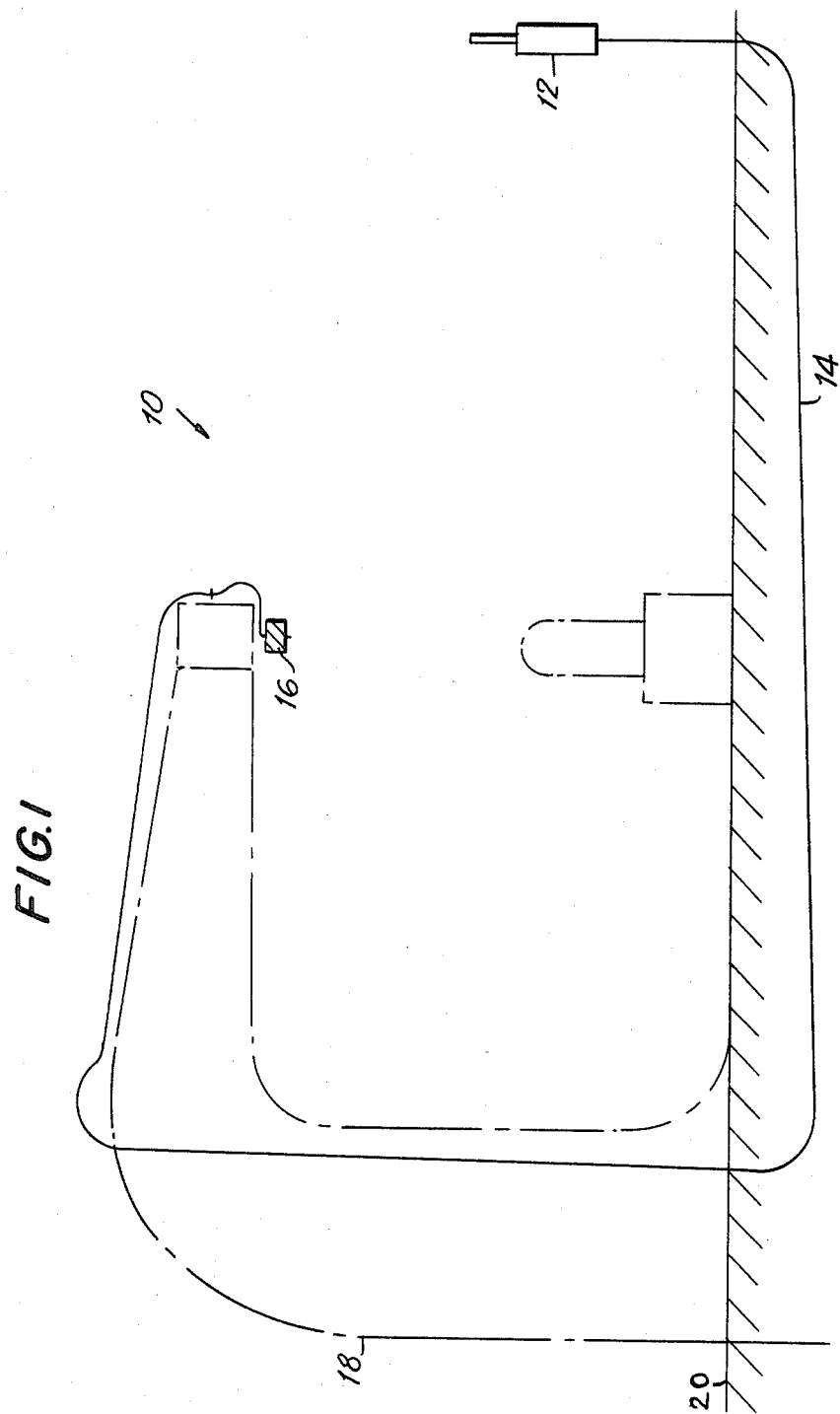
FIG. 1 is a side view showing the rivet delivery system of the present invention.

Referring now to FIG. 1, the rivet delivery system of the present invention is shown generally at 10 and includes a venturi station 12 connected by a delivery conduit 14 to a hopper 16 associated with a rivet machine 18 (shown in phantom). The venturi station 12 is remotely located from the rivet machine 18 in close proximity to a control console (not shown) utilized by the machine operator. The delivery conduit 14 is best routed from the venturi station 12, under the floor 20, and up into the rivet machine 18 to the hopper 16 so as to be unobstructive and safe.

Figure 2:
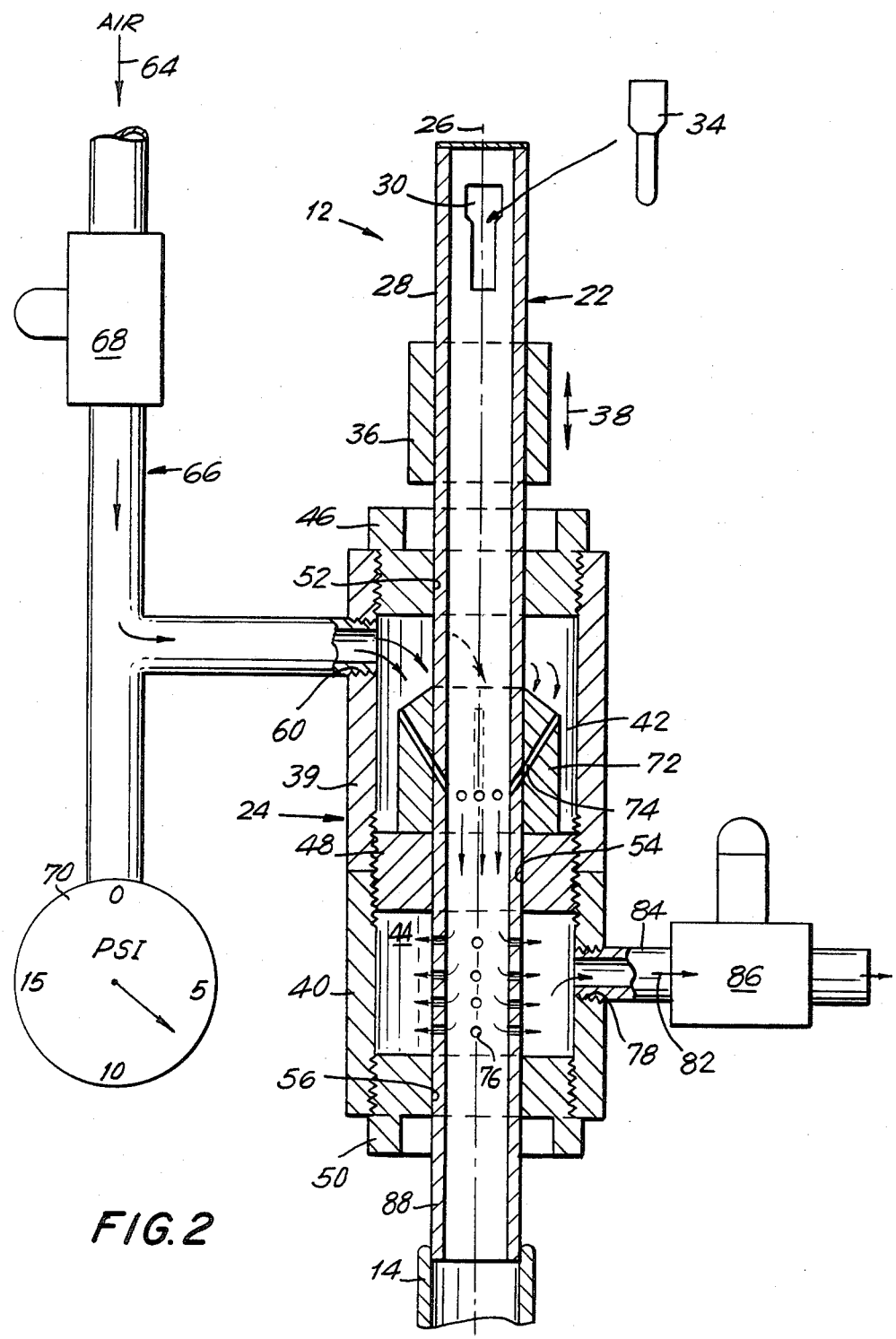
FIG. 2 is a side view in cross-section of the venturi station of the present invention shown in FIG. 1.

The venturi station 12 of the present invention is shown in detail in FIG. 2. The venturi station 12 includes a rivet introduction portion 22, a suction portion 24, and a longitudinal axis 26 passing through both the introduction portion 22 and the suction portion 24.

The rivet introduction portion 22 of the venturi station 12 includes a hollow cylindrically shaped tube 28 which can be composed from ⅜" I.D. aluminum tubing. The hollow cylindrically shaped tube 28 contains a rivet shaped slot 30 disposed longitudinally on the circumference of the hollow cylindrically shaped tube 28. The rivet shaped slot 30 permits proper introduction of a rivet 34 into the venturi station 12. The rivet shaped slot 30 is rivet shaped so as to prevent incorrect entry of the rivet 34 and to assist in the proper positioning of the rivet 34. A hollow cylindrically shaped lift sleeve 36 is disposed concentric with and external to the hollow cylindrically shaped tube 28. The hollow cylindrically shaped lift sleeve 36 is movable in the direction of arrows 38 so as to cover the rivet shaped slot 30 when automatic close system operation is desired as opposed to single rivet introduction.

The suction portion 24 of the venturi station 12 includes upper and lower hollow cylindrically shaped housings 39 and 40, respectively. The upper and lower hollow cylindrically shaped housings 39 and 40, respectively, are fixedly attached to, concentric with, and external to the hollow cylindrically shaped tube 28. The upper hollow cylindrically shaped housing 39 contains an upper chamber 42 and the lower hollow cylindrically shaped housing 40 contains a lower chamber 44. The upper chamber 42 is defined by the upper hollow cylindrically shaped housing 39, an upper plug 46, and a partition 48. The lower chamber 44 is defined by the lower hollow cylindrically shaped housing 40, the partition 48, and a lower plug 50. Thus, the partition 48 isolates the upper chamber 42 from the lower chamber 44. The upper plug 46, the partition 48, and the lower plug 50 contain centrally disposed throughbores 52, 54, and 56, respectively, permitting the hollow cylindrically shaped tube 28 to pass therethrough. The upper and lower hollow cylindrically shaped housings 39 and 40, respectively, can be composed from two 1" pipe couplings connected on end to each other by a 1" pipe joining plug that is drilled and reamed accordingly so as to sealingly receive the hollow cylindrically shaped tube 28. The 1" pipe joining plug would then serve as the partition 48. The upper and lower plugs 46 and 50, respectively, can each be composed from a 1" pipe plug that is also drilled and reamed accordingly so as to sealingly receive the hollow cylindrically shaped tube 28.

The upper hollow cylindrically shaped housing 39 contains a throughbore 60 disposed on its circumference to permit regulated filtered supply air, moving in the direction of arrows 64 through piping 66, to enter the upper chamber 42. The regulated filtered supply air is maintained at a pressure between 5 and 10 psi by a flow control 68 and a gauge 70.

A hollow cylindrically shaped sleeve 72 is disposed in the upper chamber 42. The hollow cylindrically shaped sleeve 72 rests on the partition 48 and is fixedly attached to, concentric with and external to the hollow cylindrically shaped tube 28. The hollow cylindrically shaped sleeve 72 adds thickness to the hollow cylindrically shaped tube 28 so that at least one throughbore 74 may be disposed on the circumference of the hollow cylindrically shaped tube 28 at an angle to the longitudinal axis 26. The at least one throughbore 74 can be 8 number 30 holes disposed at an angle of 30° to the longitudinal axis 26.

The portion of the hollow cylindrically shaped tube 28 which is disposed in the lower chamber 44 contains at least one throughbore 76 disposed on the circumference of the hollow cylindrically shaped tube 28. The lower hollow cylindrically shaped housing 40 contains a throughbore 78 disposed on its circumference to permit air, moving in the direction of arrows 82 through piping 84, to exit the lower chamber 44. The air exiting the lower chamber 44 is at a pressure less than the pressure of the air entering the upper chamber 42. This pressure gradient creates a suction in the hollow cylindrically shaped tube 28. The at least one throughbore 76 is added for relief and optimum vacuum and can be 16 number 30 holes. A flow control 86, disposed on the piping 84, can be set for optimum vacuum. The delivery conduit 14 is connected to the extreme lower end 88 of the hollow cylindrically shaped tube 28. The delivery conduit 14 can be approximately 85' long and may be composed from a combination of ½" I.D. plastic and aluminum tubing.

As is shown in FIG. 3, the delivery conduit 14 has a bent end portion 90. The bent end portion 90 of the delivery conduit 14 is bent perpendicular to the plane 93 of the hopper 16 so as to assist in properly positioning the rivet 34 into the hopper 16.

Additionally, the bent end portion 90, of the delivery conduit 14, has an exit orifice 92 with a partially restricted cross section as shown in FIG. 4. The bent end portion 90 can be ½" thin wall aluminum tubing bent with a 2" radius. The partially restricted cross section of the exit orifice 92 can be achieved by pinching the oriface end of the bent end portion 90. As the rivet 34 moves in the direction of arrows 96, the exit orifice 92 with its partially restricted cross section properly positions the rivet 34 for discharge into the hopper 16.

The suction portion 24 of the venturi station 12 operates as follows. The air, whose pressure is set between 5 and 10 psi by the flow control 68, moves in the direction of the arrows 64 through the piping 66 and enters the upper chamber 42 of the venturi station 12 through the throughbore 60. The air in the upper chamber 42 passes through the at least one throughbore 74 and enters the hollow cylindrically shaped tube 28. Because of the venturi effect, created by the orientation of the at least one throughbore 74, the air in the hollow cylindrically shaped tube 28 is at a pressure less than the pressure of the air entering the hollow cylindrically shaped tube 28. The low pressure air exits the hollow cylindrically shaped tube 28 through the at least one throughbore 76 into the lower chamber 44, through the throughbore 78, and into the piping 84. Another flow control 86 is connected to the piping 84 and is set for optimum vacuum. The air creating the suction both enters and leaves the venturi station 12 in a direction that is substantially transverse to the longitudinal axis 26 of the venturi station 12. Thus, due to the aforementioned operation of the suction portion 24 of the venturi station 12, a vacuum is present within a portion of the hollow cylindrically shaped tube 28.

The introduction portion 22 of the venturi station 12 can operate in two different ways. The machine operator can either introduce an individual rivet of a predetermined size into the rivet shaped slot 30 allowing for individual rivet delivery or if the machine operator wishes to operate the rivet delivery system 10 automatically, he can preload up to 300 rivets 34 through the rivet shaped slot 30 and lift the cylindrically shaped lift sleeve 36 up so that it covers the rivet shaped slot 30. In this way the rivet delivery system 10 is preloaded with up to 300 rivets 34 and will automatically feed them as required.

As the rivet 34 is introduced into the rivet shaped slot 30, it will be drawn into the low pressure suction portion 24 where the vacuum will draw the rivet 34 through the delivery conduit 14. As the rivet 34 reaches the bent end portion 90, the rivet will be automatically properly positioned by the restricted cross section of the exit orifice 92 for discharge into the hopper 16.

By utilizing suction in only a portion of the hollow cylindrically shaped tube 28 to move the rivet 34, as opposed to compressed air used throughout the length of the system for propelling the rivet 34, no air will blow out from the rivet shaped slot 30, the suction that moves the rivet 34 is constantly on unlike the case when compressed air is used which must be turned on and off as needed, and the discharging rivets 34 will not be deflected by bursts of compressed air.

It will be understood that each of the elements described above, or two or more together, may also find a useful application in other types of constructions differing from the types described above.

While the invention has been illustrated and described as embodied in a rivet delivery system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for feeding rivets comprising:
   a hopper for delivery of rivets to a riveting machine;

a conduit for delivery of rivets to said hopper, said conduit having means to position said rivets for delivery to said hopper;

a rivet delivery means connected to said hopper, said rivet delivery means having a housing-having a partition dividing an upper chamber from a lower chamber therewithin, a cylindrical tube passing through said housing, said tube having one end connected to said conduit and the other end extending above said housing and being closed save for a slot to receive rivets, at least one relief bore leading from the interior of the tube to the lower chamber, at least one angled bore leading from the upper chamber to the interior of the tube above said relief bore, inlet means connect to said upper chamber and outlet means connected to said lower chamber;

a reciprocating sleeve operatively arranged on said cylindrical tube to be movable over the slot of said tube after inserting a rivet therethrough to close said slot;

a first flow control means for delivering air under pressure to said inlet means for said upper chamber; and a second flow control means for controlling exhaust of air from said lower chamber.

2. A rivet feeding apparatus as defined in claim 1, wherein said slot of said cylindrical tube is rivet shaped so as to prevent incorrect entry of the rivets and to assist in the proper positioning of the rivets.

3. A rivet feeding apparatus as defined in claim 1, wherein said angle of said at least one angled bore is 30° to said longitudinal axis of said cylindrical tube.

* * * * *